United States Patent
Kiel et al.

(12) Patent No.: US 6,659,129 B1
(45) Date of Patent: Dec. 9, 2003

(54) VALVE ARRANGEMENT

(75) Inventors: Bernd Kiel, Wiinstorf (DE); Georg Korpak, Seelze (DE); Wilfried Menze, Springe (DE)

(73) Assignee: Wabco GmbH, Hannover (DE)

( * ) Notice: Subject to any disclaimer, the term of this patent is extended or adjusted under 35 U.S.C. 154(b) by 0 days.

(21) Appl. No.: 10/252,613

(22) Filed: Oct. 6, 1999

(30) Foreign Application Priority Data

Oct. 14, 1998 (DE) ......................................... 198 47 311

(51) Int. Cl.[7] ............................................. F15B 13/043
(52) U.S. Cl. ................................ 137/596.16; 303/118.1
(58) Field of Search .................... 137/596.16; 303/118.1

(56) References Cited

U.S. PATENT DOCUMENTS 5,443,306 A * 8/1995 Broome .................... 303/118.1

FOREIGN PATENT DOCUMENTS

| DE | 26 01 311 | 7/1977 |
| DE | 39 31 761 | 4/1991 |
| DE | 40 38 575 | 6/1991 |
| DE | 40 05 608 | 9/1991 |
| DE | 0 498 584 | 8/1992 |
| DE | 42 32 586 | 3/1994 |
| EP | 0 547 407 | 6/1993 |
| JP | 0 8058546 | 3/1996 |
| WO | WO 91/06456 | 5/1991 |
| WO | WO 91/08934 | 6/1991 |

OTHER PUBLICATIONS

WABCO Brochure, ABS Valve Package—Part No. Identification 472 500 100.0, pp. 1 and 8–11 (1997).

* cited by examiner

*Primary Examiner*—Gerald A. Michalsky
(74) *Attorney, Agent, or Firm*—Proskauer Rose LLP

(57) ABSTRACT

A valve arrangement includes an operating valve arrangement in the form of a relay valve and a control valve arrangement. The control valve arrangement includes a controlled inlet valve and a controlled outlet valve. Solenoid valves are provided for selectively routing pressure medium. A first control piston and a second control piston, which can be subjected to pressure by a pressure medium via operation of the solenoid valves, control actuation of the inlet valve and the outlet valve of the control valve arrangement. The control valve arrangement is installed directly on the housing of the operating valve arrangement to achieve a compact structural unit and to reduce the amount of pressure medium channels and pressure medium connections required. The operating valve arrangement and the control valve arrangement are designed such that parts of the control valve arrangement are located in, or constituted by, the operating valve arrangement. The pressure medium outlet of the control valve arrangement is connected to the pressure medium outlet of the operating valve arrangement, thereby permitting use of a single noise suppressor for the valve arrangement to suppress the exhaust noise.

22 Claims, 2 Drawing Sheets

VALVE ARRANGEMENT

BACKGROUND OF THE INVENTION

The present invention relates to a valve arrangement of the type including an operating valve arrangement provided in the form of a relay valve and a control valve arrangement, used, for example, for regulating supply of a pressure medium in a vehicle braking system equipped with an anti-lock braking (ABS) system.

A valve arrangement of this type, which consists generally of a relay valve and a control valve arrangement, is known, for example, from the valve design embodied as instrument number 472 500 100 0 of the company WABCO GmbH. Such valve arrangement can be used with a vehicle braking system equipped with an anti-lock braking (ABS) system. Insofar as the control valve arrangement is actuated by the ABS electronic system, use of this valve arrangement permits the brake cylinders of the vehicle brake system to be aerated or vented independently of the pressure controlled by the motor vehicle brake valve. When in a passive state, the valve arrangement functions as a relay valve used for rapid aeration and venting of the brake cylinders.

In the aforementioned valve arrangements, it is advantageous for the relay valve and the control valve arrangement to be mounted as close together as possible in order to keep the paths of the pressure medium as short as possible. This has been accomplished, for example, by attaching the relay valve and the control valve arrangement on a common support, or connecting them to each other by means of bridging elements. The pressure medium connections between the relay valve and the control valve arrangement are then established by means of pressure medium lines that are advantageously as short as possible.

It is the object of the present invention to provide a valve arrangement of the type mentioned above in which placement of the valves of the valve arrangement relative to each other and the nature of pressure medium connections of the valve arrangement can be improved.

SUMMARY OF THE INVENTION

In accordance with these and other objects of the invention, there is provided a valve arrangement which includes an operating valve and a control valve arrangement. The operating valve includes a housing defining a pressure medium input chamber, a pressure medium output chamber and a pressure medium outlet leading to a pressure medium sink. The operating valve also includes an inlet and outlet valve arrangement via which the pressure medium output chamber may be selectively connected to the pressure medium input chamber or to the pressure medium outlet, or can be closed off from both. The control valve arrangement is installed directly on the housing or in a recess formed in the housing of the operating valve arrangement, and includes a pressure medium input chamber, a pressure medium output chamber and a pressure medium outlet. The control valve arrangement further includes a controlled valve arrangement via which the pressure medium output chamber can be selectively connected to the pressure medium input chamber or to the pressure medium outlet of the control valve arrangement. The pressure medium outlet of the control valve arrangement is connected to the pressure medium outlet of the operating valve arrangement. The operating valve arrangement and the control valve arrangement are advantageously designed and connected to each other in such manner that at least a portion of the control valve arrangement is located in, or constituted by, the operating valve arrangement.

The invention offers, in particular, the advantage of maintaining a valve arrangement comprising an operating valve arrangement and a control valve arrangement combined into one compact component of simple structure.

By combining the operating valve arrangement and the control valve arrangement into one compact component, the paths of the pressure medium are shortened, such that a better response behavior of the valve arrangement is achieved. In addition, such design obviates the use of bridging elements and reduces the expense otherwise required for external pressure medium lines and screw connections.

By connecting the pressure medium outlet of the control valve arrangement to the pressure medium outlet of the operating valve arrangement, only one noise suppressor is required for proper function.

According to a further embodiment of the invention, part of the control valve arrangement is located in, or constituted by part of, the operating valve arrangement.

According to advantageous further developments of the invention, a valve seat or a receptacle for the valve seat of a solenoid valve of the control valve arrangement is installed in or at the operating valve arrangement, or is formed by part of the operating valve arrangement. The seat of the a control piston of the control valve arrangement is formed by facing sides of an area portion of the operating valve arrangement and an area portion of the control valve arrangement.

By virtue of the above-mentioned measures, the invention provides the advantage that the controllable valve arrangement of the control valve arrangement and the solenoid valves can be assembled and disassembled easily. Due to the fact that the above-mentioned valves and the control piston are located in areas of the operating valve arrangement and of the control valve arrangement which border each other, repair work or the replacement of components merely requires that the housing of the control valve arrangement be removed from the housing of the operating valve arrangement.

In accordance with an advantageous embodiment of the invention, the control valve arrangement is located laterally on the upper part of the housing of the operating valve arrangement. This arrangement has the advantage that the electrical system which serves to process electrical signals and to actuate the valve arrangement electrically can also be mounted on the valve arrangement.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
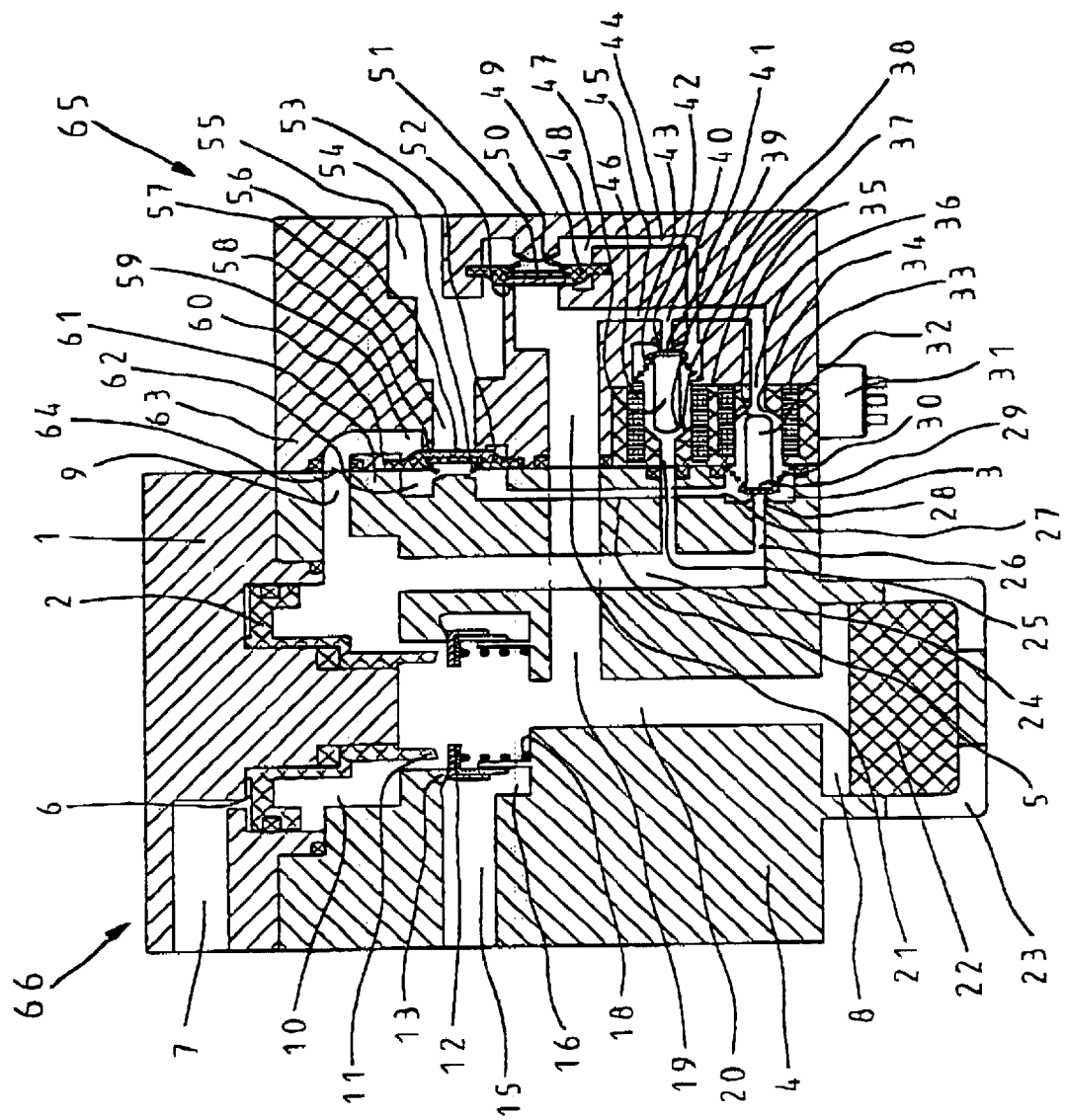
FIG. 1 is a cross-sectional view of a valve arrangement consisting of an operating valve arrangement and a control valve arrangement in accordance with an embodiment of the invention in which the control valve arrangement is located laterally of the operating valve arrangement on the lower part of the housing.

Referring now to the figures, and in particular FIG. 1, a valve arrangement in accordance with an embodiment of the invention includes an operating valve arrangement 66 and a control valve arrangement 65 combined into one component.

The operating valve arrangement 66 is provided in the form of a relay valve in which a piston serving as a relay piston 2 is movably installed in a housing 4, 1 comprised of a lower housing part 4 and an upper housing part 1. One side of the relay piston 2 forms the boundary of a control chamber 6, and the other side thereof, located away from the control chamber 6, similarly delimits a pressure medium output chamber 10.

The pressure medium output chamber 10 can be selectively connected via an inlet and outlet valve arrangement 13, 12, 11 to a pressure medium input chamber 16 or a pressure medium outlet 20 of the housing 4, 1, or can be closed off from both. The inlet valve 13, 12 of the inlet and outlet valve arrangement 13, 12, 11 is comprised of a ring-shaped inlet seat 13 and a valve closing element 12 which is movable relative thereto. The valve closing element 12 is biased against the inlet seat 13, by a spring 18. The outlet valve 11, 12 is formed by the free end of a tubular extension of the relay piston 2 configured as an output seat 11, and the valve closing element 12. The end of the pressure medium outlet 20 lets out into a chamber 8 in which noise-suppressing means 22 are provided. The wall surrounding the above-mentioned chamber 8 is provided with passage openings 23 for the pressure medium. The chamber 8, and the noise-suppressing means 22, which may be made of a knit plastic material, constitute components of a noise suppressor which is preferably connected in a removable manner to the housing 4, 1.

The control chamber 6 is connected to a control input 7 of the housing 4, 1, which, in turn, can be selectively connected to a source of control pressure or to a pressure medium sink via a valve (not shown), in the form of, for example, a motor vehicle braking valve. The pressure medium input chamber 16 is connected to a pressure medium input 15 of the housing 4, 1, which, in turn, is connected to a source of pressure medium. A pressure medium output 9 of the housing 4, 1 is connected to the pressure medium output chamber 10.

The control valve arrangement 65 includes a housing 63 which is laterally attached to the lower housing part 4 of the operating valve arrangement 66 by means of suitable fasteners, for example, screws. The housing 63 of the control valve arrangement 5 is provided with a pressure medium input chamber 59, a pressure medium output chamber 57 and a pressure medium outlet 21. The pressure medium input chamber 59 is connected to a pressure medium input 64 of the housing 63. The control valve arrangement 65 and the operating valve arrangement 66 are positioned relative to one another in such a manner that the pressure medium input 64 of the control valve arrangement 65 is directly aligned with the pressure medium output 9 of the operating valve arrangement 66. The pressure medium output chamber 57 is connected to a pressure medium output 55 of the housing 63. A consumer (not shown), provided, for example, in the form of a brake cylinder, is connected to the pressure medium output 55 via a suitable pressure medium channel.

The pressure medium input chamber 59 and the pressure medium output chamber 57 of the control valve arrangement 65 can be selectively connected to each other or closed off from one another via a first controlled valve serving as an inlet valve 58, 56. A first control piston 53 is provided to permit actuation of the inlet valve 58, 56. The first control piston 53 is formed by a membrane, an outer edge of which is disposed between facing sides presented by an area portion 61 of the operating valve arrangement 66 and an area portion 60 of the control valve arrangement 65, and is held in place, for example, by clamped engagement between these two area portions 61 and 60. The area portions 51 and 60 thus serve as seats for the first control piston 53. The inlet valve 58, 56 is comprised of an inlet seat 58 which is integral to the housing and a valve closing element 56 which is formed by a reinforced area of the membrane. The valve closing element 56 is biased against the inlet seat 58 by a spring 54. One end of the spring 54 is supported by the housing 4, 1 of the operating valve arrangement 66, and an opposite end thereof biases the valve closing element 56 in the direction of the inlet seat 58.

The pressure medium output chamber 57 of the control valve arrangement 65 can be selectively connected to or closed off from the pressure medium outlet 21 of the control valve arrangement 65 via a second controlled valve serving as an outlet valve 52, 51. The pressure medium outlet 21 of the control valve arrangement 65 lets out into a pressure medium channel 19 provided in the form of a housing channel located in the housing 4, 1 of the operating valve arrangement 66. The end of the pressure medium channel 19 distant from the pressure medium outlet 21 of the control valve arrangement 65 in turn lets out into the pressure medium outlet 20 of the operating valve arrangement 66. Thus, the pressure medium outlet 21 of the control valve arrangement 65 is connected directly to the pressure medium outlet 20 of the operating valve arrangement 66, rather than being connected to the pressure medium outlet 20 via the pressure medium output chamber 10 of the operating valve arrangement 66. By virtue of such design, a common pressure medium outlet provided in the valve arrangement 66, 65 is alone sufficient to permit a venting of the consumer in a manner independent of a venting of the pressure medium output chamber 10 of the operating valve arrangement 66.

The inlet valve 58, 56 and the outlet valve 52, 51 together form a controlled valve arrangement 58, 56, 52, 51 by means of which the pressure medium output chamber 57 of the control valve arrangement 65 can be selectively connected, as mentioned above, to the pressure medium input chamber 59 or to the pressure medium outlet 21 of the control valve arrangement 65.

A second control piston 49 permits actuation of the outlet valve 52, 51. The second control piston 49 is also formed by a membrane, an outer edge of which is attached in a seat of the control piston 49 located in the housing 63 of the control valve arrangement 65. The outlet valve 52, 51 comprises an outlet seat 52 integral with the housing 63, and a closing element 51 which is formed by a reinforced area of the membrane. The closing element 51 is held in biased contact against the outlet seat 52 by a spring 50.

One side of the first control piston 53 delimits the pressure medium input chamber 59 located in the housing 63 of the control valve arrangement 65, and the other side of the first control piston bounds a first control chamber 62, located within the housing 4, 1 of the operating valve arrangement 66 or constituted by a recess in the wall of the housing 4, 1 of the operating valve arrangement 66. As depicted, the recess constituting the first control chamber 62 is located in the side of the wall of the housing 4, 1 adjoining the control valve arrangement 65. One side of the second control piston 49 delimits the pressure medium output chamber 57, and the other side bounds a second control chamber 48 of the control valve arrangement 65 located in the housing 63 of the control valve arrangement 65.

The first control chamber 62 is connected to a pressure medium output 27 of a first solenoid valve 28, 29, 34, 35 via a pressure medium channel 5 located in the housing 4, 1 of the operating valve arrangement 66 and provided in the form of a housing channel. The first solenoid valve 28, 29, 34, 35, which is in the form of a 3/2 way valve, is provided with an inlet valve 28, 29 and an outlet valve 34, 35. A pressure medium input 26 of the first solenoid valve 28, 29, 34, 35 is constituted by a pressure medium channel provided in the form of a housing channel located in the housing 4, 1 of the operating valve arrangement 66. The pressure medium input 26 is followed by an additional pressure medium channel 24 located in the housing 4, 1 of the operating valve arrangement 66, and which is also provided in the form of a housing channel, which connects the pressure medium input 26 directly to the pressure medium output chamber 10 of the operating valve arrangement 66. The inlet valve 28, 29 has an inlet seat 28 and a valve closing element 29, wherein the inlet seat 28 is formed by a ring-shaped projection of the housing 4, 1 of the operating valve arrangement 66 surrounding the pressure medium input 26 on a side thereof directed towards the valve closing element 29

The valve closing element 29 of the inlet valve 28, 29 is biased by the force of a spring 30 against the inlet seat 28. The outlet valve 34, 35 comprises an outlet seat 34 and a valve closing element 35. The valve closing elements 29 and 35 are constituted by the ends of an armature 32 which acts together with a coil 33. A pressure medium outlet 36 of the first solenoid valve 28, 29, 34, 35 is connected to the pressure medium outlet 21 of the control valve arrangement 65 via a pressure medium channel 45, provided in the form of a housing channel located in the housing 63 of the control valve arrangement 65.

The first solenoid valve 28, 29, 34, 35 permits selective connection of the first control chamber 62 of the control valve arrangement 65 to the pressure medium output chamber 10 of the operating valve arrangement 66 or to the pressure medium outlet 21 of the control valve arrangement 65. The inlet seat 28, the pressure medium output 27 and the spring 30 of the first solenoid valve 28, 29, 34, 35 are located in a recess 3 of the housing 4, 1 of the operating valve arrangement 66, said recess 3 being located in the side of the wall of the housing 4, 1 of the operating valve arrangement 66 adjoining the housing 63 of the control valve arrangement 65. The recess 3 into which the armature 32 with the valve closing element 29 also extends, thus serves as a seat for part of the first solenoid valve 28, 29, 34, 35. The coil 33 and the outlet seat 34 of the first solenoid valve 28, 29, 34, 35 are located in a recess 37 in the housing 63 adjoining the housing 4, 1 of the operating valve arrangement 66.

A second solenoid valve 38, 39, 42, 41 is located in the recess 37 of the housing 63 of the control valve arrangement 65, which is also designed as a 3/2 way valve and including an inlet valve 38, 39 and an outlet valve 42, 41. The second solenoid valve 38, 39, 42, 41 permits the selective connection of the second control chamber 48 of the control valve arrangement 65 to the pressure medium output chamber 10 of the operating valve arrangement 66 or to the pressure medium outlet 21 of the control valve arrangement 65. The second solenoid valve 38, 39, 42, 41 is provided with a inlet valve 38, 39 comprising an inlet seat 38 and a valve closing element 39, and with an outlet valve 42, 41 comprising an outlet seat 42 and a valve closing element 41. The valve closing element 41 of the outlet valve 42, 41 is biased against the outlet seat 42 by the force of a spring 43, The valve closing elements 39 and 41 are formed by the ends of an armature 47 which acts together with a coil 46. A pressure medium input 25 of the second solenoid valve 38, 39, 42, 41 is connected to the pressure medium channel 24 located in the housing 4, 1 of the operating valve arrangement 66 via a pressure medium channel provided in the form of a housing channel located in the housing 4, 1 of the operating valve arrangement 66. The pressure medium input 25 of the second solenoid valve 38, 39, 42, 41 is thus also directly connected to the pressure medium output chamber 10 of the operating valve arrangement 66. A pressure medium output of the second solenoid valve 38, 39, 42, 41 is connected to the second control chamber 48 via a pressure medium channel 44 provided in the form of a housing channel. A pressure medium outlet 40 of the second solenoid valve 38, 39, 42, 41 is connected to the pressure medium outlet 21 of the control valve arrangement 65 via the pressure medium channel 45.

Sealing rings are installed between the sides of the operating valve arrangement 66 facing each other and the control valve arrangement 65 in such manner that they enclose, in the manner of an o-ring seal, the transitional zones from the pressure medium channels of the operating valve arrangement 66 to the pressure medium channels of the control valve arrangement 65.

The functions of the above-described valve arrangements are explained in fiber detail below.

When control pressure is fed into the control chamber 6 of the operating valve arrangement 66, the operating valve arrangement 66 delivers a pressure which is dependent upon the level of the control pressure. The delivered pressure opens the inlet valve 58, 56 of the control valve arrangement 65. The delivered pressure then travels through the control valve arrangement 65 and out of the pressure medium output 55 of the control valve arrangement 65 to the consumer. During this process, the output pressure of the operating valve arrangement 66 flows through the open inlet valve 38, 39 of the second solenoid valve 38, 39, 42, 41 and into the second control chamber 48 of the control valve arrangement 65, thereby maintaining the outlet valve 52, 51 in its closed position.

If further increase of pressure in the consumer is to be prevented despite further pressure increase in the control chamber 6 and in the pressure medium output chamber 10 of the operating valve arrangement 66, the first solenoid valve 28, 29, 34, 35 is actuated in such manner that the outlet valve 34, 35 thereof is moved into a closed position and the inlet valve 28, 29 thereof into an open position. The compressed air then flows into the first control chamber 62 assigned to the inlet valve 58, 56 of the control valve arrangement 65 via the first solenoid valve 28, 29, 34, 35. The inlet valve 58, 56 is resultantly moved to a closed position.

If the pressure in the consumer is to be lowered without lowering the pressure in the control chamber 6 of the operating valve arrangement 66, the solenoid valve 38, 39, 42, 41 assigned to the second control chamber 48 of the control valve arrangement 67 is actuated in such manner that the inlet valve 38, 39 thereof closes and the outlet valve 42, 41 thereof opens. The second control chamber 48 is then vented via the pressure medium outlet 21 of the control valve arrangement 65 and the pressure medium outlet 20 of the operating valve arrangement 66 in communication therewith. The pressure in the consumer is lowered via the outlet valve 52, 51 of the control valve arrangement 65 which is then moved to its open position and via the pressure medium outlet 21 of the control valve arrangement 65 and the pressure medium outlet 20 of the operating valve arrangement 66.

If the pressure in the consumer is to be lowered by reduction of the pressure in the control chamber 6 of the operating valve arrangement 66, the first solenoid valve 28, 29, 34, 35 is also actuated in such manner that the inlet valve 28, 29 thereof is moved into its closed position and the outlet valve 34, 35 thereof into its open position. As a result, the first control chamber 62 assigned to inlet valve 58, 56 of the control valve arrangement 65 is vented via the pressure medium outlet 21 of the control valve arrangement 65 and the pressure medium outlet 20 of the operating valve arrangement 66. The pressure in the consumer is then lowered via the inlet valve 58, 56 of the control valve arrangement 65 which is moved into its open position and via the pressure medium output chamber 10 and the pressure medium outlet 20 of the operating valve arrangement 66.

Figure 2:
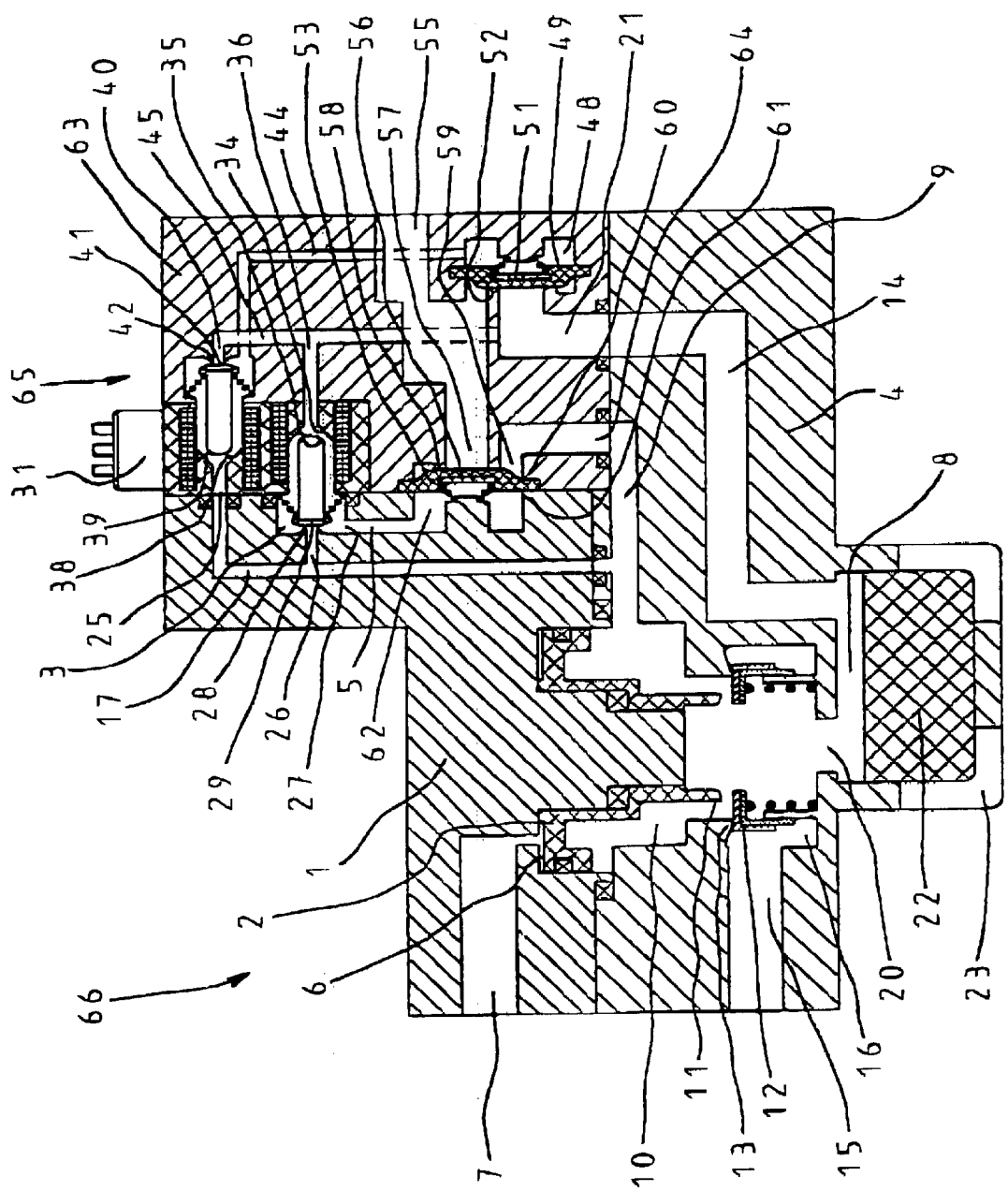
FIG. 2 is a cross-sectional view of a valve arrangement in accordance with another embodiment of the invention substantially identical to the valve arrangement shown in FIG. 1, in which the control valve arrangement is provided in the form of a lid located laterally of the operating valve arrangement on the upper part of the housing.

Turning now to FIG. 2, a valve arrangement is depicted which comprises an operating valve arrangement and a control valve arrangement, and which employs essentially the same design as the valve arrangement shown in FIG. 1. In the embodiment of FIG. 2, however, the control valve arrangement is not located laterally on the lower housing part 4, but rather, is provided laterally, in the form of a lid, on the upper housing part 1 of the operating valve arrangement 66. As such, the disclosure given below is essentially directed only to the differences in arrangement of the control valve arrangement on the operating valve arrangement from that of the valve arrangement according to FIG. 1, and to the partially modified arrangement of the housing channels serving as pressure medium channels. For the sake of greater clarity, the components which are identical to the components shown in FIG. 1 are given the same reference numbers.

As mentioned above, the housing 4, 1 of the operating valve arrangement 66 comprises a lower housing part 4 and an upper housing part 1 serving as a lid of the housing 4, 1. In the embodiment of FIG. 2, the control valve arrangement 65 is installed on one side of the upper housing part 1. The control valve arrangement 65 is connected to the operating valve arrangement 66 by means of suitable fasteners, for example, screws. The lower housing part 4 and the upper housing part 1 are designed so that they define the boundary of a step-shaped recess which serves as a seat for the control valve arrangement 65.

The first control piston 53 of the inlet valve 58, 56 of the control valve arrangement 65 is formed by a membrane, an outer edge of which is installed between the sides facing each other of an area portion 61 of the upper housing part 1 of the operating valve arrangement 66 and of an area portion 60 of the control valve arrangement 65, and which is held in place by clamped engagement between these area portions 61 and 60. The inlet seat 28 of the first solenoid valve 28, 29, 34, 35 is formed by a ring-shaped extension of the upper housing part 1 of the operating valve arrangement 66 which surrounds the pressure medium input 26 on a side thereof directed towards the valve closing element 29. The pressure medium input 26 of the first solenoid valve 28, 29, 34, 35 and the pressure medium input 25 of the second solenoid valve 38, 39, 32, 41 are connected via a common pressure medium channel 17 to the pressure medium output 9 of the operating valve arrangement 66. The pressure medium input 64 of the control valve arrangement 65 is connected to the pressure medium output 9 of the operating valve arrangement 66 and the pressure medium outlet 21 of the control valve arrangement 65 is connected via a channel-pressure medium channel 14 directly to the chamber 8 assigned to the pressure medium outlet 20 of the operating valve arrangement 66. The above-mentioned pressure medium channel 17 is formed by a housing channel provided in the upper housing part 1 and the channel-pressure medium channel 14 is formed by a housing channel of the operating valve arrangement 66 located in the lower housing part 4.

Between the sides of the housing 4, 1 of the operating valve arrangement 66 and the housing 63 of the control valve arrangement 65 which face one another, the passages from the pressure medium channels of the operating valve arrangement 66 to the pressure medium channels of the control valve arrangement 65, as well as the passage from the pressure medium output 9 of the operating valve arrangement 66 to the pressure medium input 64 of the control valve arrangement 65, are provided with enclosing sealing elements, conveniently in the form of o-rings.

The channel-pressure medium channel 14 located in the housing 4, 1 of the operating valve arrangement 66 following the pressure medium outlet 21 of the control valve arrangement 65 lets out in the same chamber 8 in which the pressure medium outlet 20 of the operating valve arrangement 66 also lets out. The chamber 8 may be a chamber on the inlet side of a noise suppressor, as described with reference to the figures, or may alternatively be a chamber delimited by a connection piece for the noise suppressor of the operating valve arrangement or any other chamber included as part of the operating valve arrangement 66 connecting the pressure medium outlet 20 to the channel-pressure medium channel 14. In any event, the pressure medium outlet 21 of the control valve arrangement 65 is connected to the pressure medium outlet 20 of the operating valve arrangement 66. In all instances, only one noise suppressor is required for the operating valve arrangement 66 and for the control valve arrangement 65.

The solenoid valves 28, 29, 34, 35 and 38, 39, 42, 41 are installed in the recess 37 of the control valve arrangement 65 in such manner that the electrical contact elements of the plug-in device 31 extend essentially at a perpendicular to the upper housing part 1 of the valve arrangement 66, 65. The plug-in device 31 is thus located on the upper part of the valve arrangement 66, 65.

Since, as can be clearly seen in both examples of embodiments of the invention, the control chamber 62 for the inlet valve 58, 56 of the control valve arrangement 65, the pressure medium input 26, the inlet seat 28 and the pressure medium output 27 of the first solenoid valve 28, 29, 34, 35 of the control valve arrangement 65 and also the control chamber 62 of the inlet valve 58, 56 of the control valve arrangement 65 are installed with the pressure medium channel 5 connecting the pressure medium output 27 of the first solenoid valve 28, 29, 34, 35 within housing 4, 1 of the operating valve arrangement 66, and since, furthermore, part of the seat of the first control piston 53 is constituted by a area portion 61 of the operating valve arrangement 66, part of the control valve arrangement 65 is located in the operating valve arrangement 66 or part of the control valve arrangement 65 is constituted by the operating valve arrangement 66.

In accordance with the invention, the complete control valve arrangement 65, in which the above-mentioned control chamber 62, the seat for the one control piston 53 and the above-mentioned parts of a solenoid valve 28, 29, 34, 35 are located in the housing 63 of the control valve arrangement 65, can be installed directly on the operating valve arrangement 66 or in a recess of the operating valve arrangement 66. Also, in an embodiment of the invention designed in this manner, the pressure medium outlet 21 of the control valve arrangement 65 is connected to the pressure medium outlet 20 of the operating valve arrangement 66.

According to the invention it is also possible to connect the pressure medium outlet 36 of the first solenoid valve 28, 29, 34, 35 and the pressure medium outlet 40 of the second solenoid valve 38, 39, 42, 41 directly to the pressure medium outlet 20 of the operating valve arrangement 66 or to the chamber 8 by means of a pressure medium channel provided in the form of a housing channel.

According to the invention, the recess for the control pistons 53 and 49 of the two controlled valves 58, 56 and 52, 51 can also be formed by area portions of the sides of the operating valve arrangement 66 and the control valve arrangement 65 which face each other.

The pressure of the pressure medium output chamber 10 of the operating valve arrangement 66, as well as the pressure of any other pressure medium source, for example, supply pressure, can be used as control pressure for the two controlled valves 58, 56 and 52, 51.

The valve arrangement according to the invention can be used in a pneumatic as well as in a hydraulic system, wherein the system may be a motor vehicle braking system or any other installation finctioning with a pressure medium.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A valve arrangement, comprising:
    an operating valve arrangement including a housing defining a pressure medium input chamber, a pressure medium output chamber and a pressure medium outlet leading to a pressure medium sink, the operating valve arrangement further including an inlet and outlet valve arrangement via which the pressure medium output chamber is selectively connectable to the pressure medium input chamber or to the pressure medium outlet, or can be closed off from the pressure medium input chamber and the pressure medium outlet; and
    a control valve arrangement installed on the housing of the operating valve arrangement, the control valve arrangement including a pressure medium input chamber, a pressure medium output chamber and a pressure medium outlet, the control valve arrangement further including a controlled valve arrangement via which the pressure medium output chamber can be selectively connected to the pressure medium input chamber or to the pressure medium outlet of the control valve arrangement, the pressure medium outlet of the control valve arrangement being connected to the pressure medium outlet of the operating valve arrangement, wherein the controlled valve arrangement further comprises a first controlled valve serving as an inlet valve and second controlled valve serving as an outlet valve, the control valve arrangement further including a first control chamber and a first control piston which can be subjected to pressure by pressure medium within the first control chamber, the first control piston controlling actuation of the inlet valve, and a second control chamber and a second control piston which can be subjected to pressure by pressure medium within the second control chamber, the second control piston controlling actuation of the outlet valve, and the control valve arrangement further including a seat for the first control piston and a seat for the second control piston, the seat for the first control piston being formed by facing sides comprised of an area portion of the operating valve arrangement and an area portion of the control valve arrangement.

2. A valve arrangement according to claim 1, wherein the control valve arrangement is installed directly on the housing.

3. A valve arrangement according to claim 1, wherein the housing includes a recess formed therein, the control valve arrangement being installed in the recess.

4. A valve arrangement according to claim 1, wherein:
    the housing of the operating valve arrangement includes a lower housing part and an upper housing part; and
    the control valve arrangement is located laterally on the upper housing part of the operating valve arrangement.

5. A valve arrangement according to claim 1, wherein:
    the housing of the operating valve arrangement includes a lower housing part and an upper housing part; and
    the control valve arrangement is located laterally on the lower housing part of the operating valve arrangement.

6. A valve arrangement according to claim 1, wherein the first control piston corresponding to the inlet valve of the control valve arrangement is formed by a membrane which is held in place by clamped engagement of an outer edge thereof between the facing sides of the area portions of the operating valve arrangement and the control valve arrangement.

7. A valve arrangement according to claim 1, wherein the first control chamber is located within the housing of the operating valve arrangement.

8. A valve arrangement according to claim 1, wherein the first control chamber is defined by a recess in a side wall of the housing of the operating valve arrangement which adjoins the control valve arrangement.

9. A valve arrangement according to claim 1, wherein:
    the control valve arrangement further comprises a first solenoid valve via which the first control chamber can be selectively subjected to a control pressure or be connected to a pressure medium sink, and a second solenoid valve via which the second control chamber can be selectively subjected to a control pressure or be connected to a pressure medium sink;
    the first and second solenoid valves each includes a pressure medium input, a pressure medium output and a pressure medium outlet, the pressure medium outlet of each of said first and second solenoid valves being connected to the pressure medium outlet of the control valve arrangement via a pressure medium channel; and
    valve seats are provided for said first and second solenoid valves, at least one of said valve seats being located in, or constituted by, the operating valve arrangement.

10. A valve arrangement according to claim 9, wherein:
    the operating valve arrangement includes a seat for a part of one of the solenoid valves, the seat being defined by a recess in a side wall of the housing of the operating valve arrangement which adjoins the control valve arrangement, one valve seat of said one solenoid valve being located in the recess defining said seat, said one solenoid valve including a valve closing element, the recess being configured for receiving at least a portion of the valve closing element; and
    the pressure medium input and the pressure medium output of said one solenoid valve are located in the side wall of the housing of the operating valve arrangement in such manner that the pressure medium input is communicative with the valve seat and the pressure medium output is communicative with the recess.

11. A valve arrangement according to claim 9, wherein one of the control chambers of the control valve arrangement is connected to the pressure medium output of one of the solenoid valves of the control valve arrangement via a pressure medium channel located in the housing of the operating valve arrangement.

12. A valve arrangement, comprising:

an operating valve including a housing defining a pressure medium input chamber, a pressure medium output chamber and a pressure medium outlet leading to a pressure medium sink, the operating valve further including an inlet and outlet valve arrangement located in the housing via which the pressure medium output chamber is selectively connectable to the pressure medium input chamber or to the pressure medium outlet, or can be closed off from the pressure medium input chamber and the pressure medium outlet;

a control valve arrangement including a pressure medium input chamber, a pressure medium output chamber and a pressure medium outlet, the control valve arrangement further including a controlled valve arrangement via which the pressure medium output chamber is selectively connectable to the pressure medium input chamber or to the pressure medium outlet of the control valve arrangement; and the operating valve arrangement and the control valve arrangement being designed and connected to each other in such manner that at least a portion of operational elements of the control valve arrangement is located in the operating valve arrangement or constituted thereby, the pressure medium outlet of the control valve arrangement being connected to the pressure medium outlet of the operating valve arrangement, wherein the controlled valve arrangement further comprises a first controlled valve serving as an inlet valve and second controlled valve serving as an outlet valve, the control valve arrangement further including a first control chamber and a first control piston which can be subjected to pressure by pressure medium within the first control chamber, the first control piston controlling actuation of the inlet valve, and a second control chamber and a second control piston which can be subjected to pressure by pressure medium within the second control chamber, the second control piston controlling actuation of the outlet valve, and the control valve arrangement further including a seat for the first control piston and a seat for the second control piston, the seat for the first control piston being formed by facing sides comprised of an area portion of the operating valve arrangement and an area portion of the control valve arrangement.

13. A valve arrangement according to claim 12, wherein the control valve arrangement is installed directly on the housing.

14. A valve arrangement according to claim 12, wherein the housing includes a recess formed therein, the control valve arrangement being installed in the recess.

15. A valve arrangement according to claim 12, wherein:

the housing of the operating valve arrangement includes a lower housing part and an upper housing part; and the control valve arrangement is located laterally on the upper housing part of the operating valve arrangement.

16. A valve arrangement according to claim 12, wherein:

the housing of the operating valve arrangement includes a lower housing part and an upper housing part; and the control valve arrangement is located laterally on the lower housing part of the operating valve arrangement.

17. A valve arrangement according to claim 12, wherein the first control piston corresponding to the inlet valve of the control valve arrangement is formed by a membrane which is held in place by clamped engagement of an outer edge thereof between the facing sides of the area portions of the operating valve arrangement and the control valve arrangement.

18. A valve arrangement according to claim 12, wherein the first control chamber is located within the housing of the operating valve arrangement.

19. A valve arrangement according to claim 12, wherein the first control chamber is defined by a recess in a side wall of the housing of the operating valve arrangement which adjoins the control valve arrangement.

20. A valve arrangement according to claim 12, wherein:

the control valve arrangement further comprises a first solenoid valve via which the first control chamber can be selectively subjected to a control pressure or be connected to a pressure medium sink, and a second solenoid valve via which the second control chamber can be selectively subjected to a control pressure or be connected to a pressure medium sink;

the first and second solenoid valves each includes a pressure medium input, a pressure medium output and a pressure medium outlet, the pressure medium outlet of each of said first and second solenoid valves being connected to the pressure medium outlet of the control valve arrangement via a pressure medium channel; and valve seats are provided for said first and second solenoid valves, at least one of said valve seats being located in, or constituted by, the operating valve arrangement.

21. A valve arrangement according to claim 20, wherein:

the operating valve arrangement includes a seat for a part of one of the solenoid valves, the seat being defined by a recess in a side wall of the housing of the operating valve arrangement which adjoins the control valve arrangement, one valve seat of said one solenoid valve being located in the recess defining said seat, said one solenoid valve including a valve closing element, the recess being configured for receiving at least a portion of the valve closing element; and the pressure medium input and the pressure medium output of said one solenoid valve are located in the side wall of the housing of the operating valve arrangement in such manner that the pressure medium input is communicative with the valve seat and the pressure medium output is communicative with the recess.

22. A valve arrangement according to claim 20, wherein one of the control chambers of the control valve arrangement is connected to the pressure medium output of one of the solenoid valves of the control valve arrangement via a pressure medium channel located in the housing of the operating valve arrangement.

* * * * *